United States Patent [19]

Longman et al.

[11] 4,057,869
[45] Nov. 15, 1977

[54] WINDSHIELD WIPER UNIVERSAL CONNECTOR FOR BAYONET AND HOOK ARMS

[75] Inventors: Rodney A. Longman, Deerfield Beach; Thomas J. Chiaramonte, Boca Raton, both of Fla.

[73] Assignee: Pylon Corporation, Fort Lauderdale, Fla.

[21] Appl. No.: 759,084

[22] Filed: Jan. 13, 1977

[51] Int. Cl.² .............................................. B60S 1/40
[52] U.S. Cl. ................................................ 15/250.32
[58] Field of Search ............ 15/250.32, 250.35, 250.42

[56] References Cited
U.S. PATENT DOCUMENTS

| 3,757,377 | 9/1973 | Hayhurst | 15/250.32 |
| 3,896,519 | 7/1975 | Pankow | 15/250.32 |
| 3,928,887 | 12/1975 | Lopez et al. | 15/250.32 |

FOREIGN PATENT DOCUMENTS 1,414,690  9/1965  France .............................. 15/250.32

*Primary Examiner*—Edward L. Roberts
*Attorney, Agent, or Firm*—Seymour Rothstein

[57] ABSTRACT

A universal connector for selectively coupling a windshield wiper blade holder with the end of a windshield wiper arm of either the bayonet mounting type or the hook mounting type. The universal connector comprises a unitary molded body having a pair of spaced apart side members for straddling a central portion of the wiper blade holder and including a hollow coupler portion to receive the bayonet arm end. First complementary means are provided for detachably securing the bayonet arm end within the coupler portion of the body. The body also includes a contoured exterior surface adapted to receive the hook type arm and second complementary means for detachably securing the hook type arm to the body.

8 Claims, 11 Drawing Figures

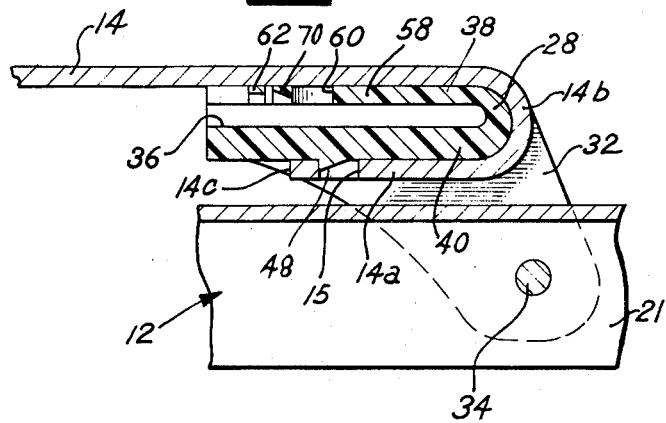
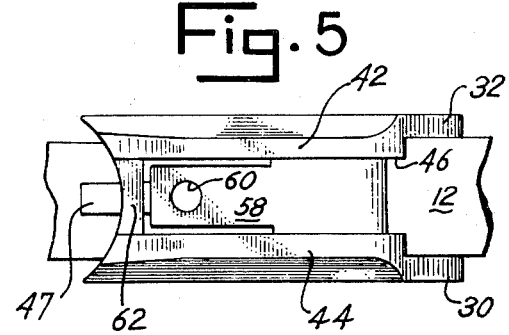
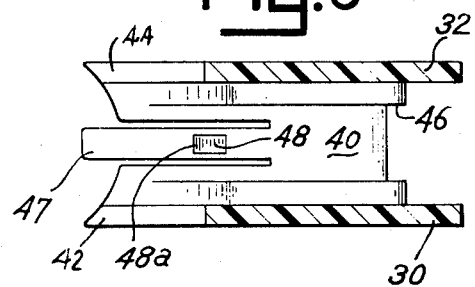
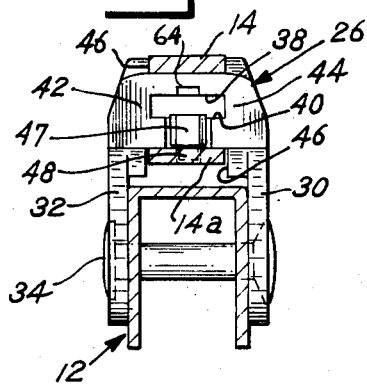
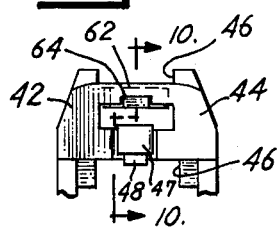
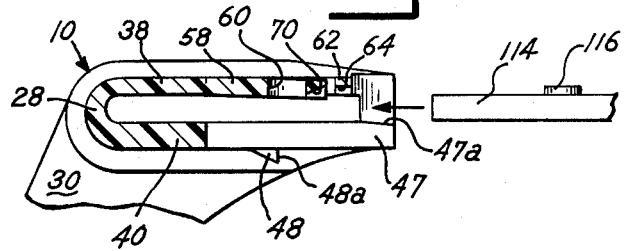
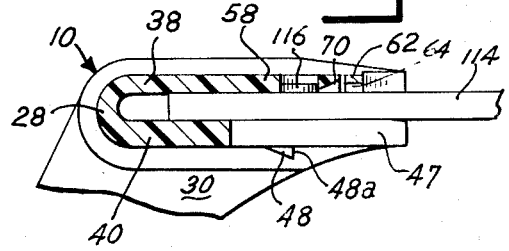

WINDSHIELD WIPER UNIVERSAL CONNECTOR FOR BAYONET AND HOOK ARMS

BACKGROUND AND SUMMARY OF THE INVENTION

This invention relates to windshield wipers and, more particularly, to a universal connector for selectively coupling a windshield wiper blade holder with the end of either a bayonet type wiper arm or a hook type wiper arm.

Two types of windshield wiper arms in common use today are a bayonet mounting type and a hook mounting type. The bayonet arm has an end generally rectangular in cross section adapted to engage a connector. The hook arm has a hook shaped end adapted to engage a connector. Normally, one connector is provided for mounting the bayonet arm end to a windshield wiper holder and a different connector is required to mount a hook arm end to a windshield wiper holder. There is no single connector for selectively coupling a windshield wiper holder to the end of an arm of either the bayonet mounting type or the hook mounting type.

A principal object of this invention is to provide a universal connector for selectively coupling a windshield wiper blade holdeer with the end of a windshield wiper arm of either the bayonet mounting type or the hook mounting type.

Another object of the present invention is to provide an improved connector for windshield wiper blade holders which will permit selective coupling of the blade holder to either a hook arm end or a bayonet arm end, with the universal connector being molded integrally from plastic, and including means therein facilitating detachable connection of the selected arm end to the universal connector.

A further object of the present invention is to provide a universal connector integrally molded from plastic which is adapted to be mounted selectively to either a bayonet end arm or a hook end arm, the connector being formed with juxtaposed cantilevered tab portions, one tab portion for detachably engaging and retaining a bayonet arm end and the other tab portion for detachably engaging and retaining a hook arm end.

Other objects and advantages of this invention will become more apparent hereinafter.

BRIEF DESCRIPTION OF THE DRAWING

FIG. 4 is a cross sectional elevational view illustrating the hook arm end connected to the universal connector;

FIG. 5 is a plan view of the windshield wiper blade assembly taken generally along the line 5—5 of FIG. 3 with the hook arm omitted;

FIG. 6 is a bottom view of the universal connector taken generally along the line 6—6 of FIG. 3 with the hook arm omitted;

FIG. 7 is an end view of the wiper blade assembly taken generally in the direction of the arrow 7 shown in FIG. 3 and including the hook arm;

FIG. 8 is an enlarged perspective view illustrating the connection of a bayonet arm end to the universal connector;

FIG. 9 is an end view of the universal connector of FIG. 8;

FIG. 10 is a cross sectional view illustrating the connection of a bayonet arm end to the universal connector of FIG. 8 taken generally along the line 10—10 of FIG. 9; and FIG. 11 is a cross sectional elevational view illustrating the bayonet arm end connected within the universal connector.

DETAILED DESCRIPTION OF THE PREFERRED EMBODIMENT

Figure 1:
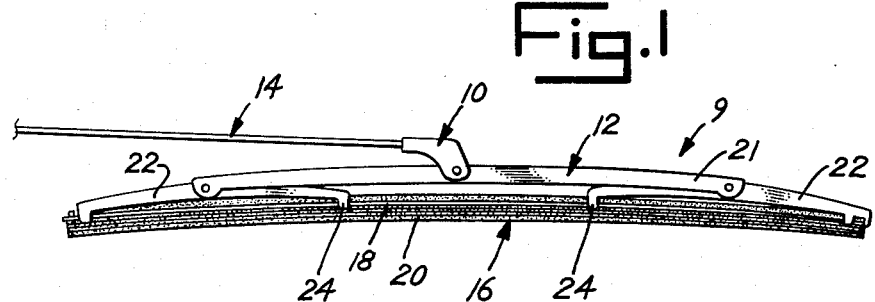
FIG. 1 is a side elevational view of a wiper blade holder connected by means of a universal connector embodying principles of the present invention to a wiper arm end.

Referring to FIG. 1 there is illustrated a windshield wiper blade assembly 9 including wiper blade holder 12 that is adapted to be connected to a wiper arm 14 by means of the universal connector 10 of the present invention. The blade holder 12 is adapted to replaceably retain a resilient wiping element 16. The wiping element 16 includes a backing strip 18 engaging the resilient blade portion 20. The blade holder 12 may comprise link portions 22 pivoted to center link 21, with each link portion 22 having claws 24 thereon for engaging and retaining the wiping element 16.

As will be more fully set forth herein, the universal connector 10 is intended to selectively couple a windshield wiper arm of either the bayonet mounting type or the hook mounting type. FIGS. 2-7 will be used to explain the connection of the hook arm end to the universal connector and FIGS. 8-11 will be used to explain the connection of the bayonet arm end to the universal connector. The arm will be designated by the numeral 14 in the discussion of the hook end arm and by the numeral 114 in the discussion of the bayonet end arm.

With reference to FIGS. 2-7, there is better shown the connection of a hook arm end to the universal connector. The hook arm 14 includes an end comprising a straight or planar portion 14a that is substantially parallel to the arm 14 and connected integrally by a uniformly contoured curved connecting portion 14b. Within the portion 14a of arm 14 there is an opening or hole 15.

The universal connector 10 comprises a unitary molded body 26 of a strong resilient elastomer or plastic material such as Celcon M-90 or Delrin 500. Depending from the central portion of the body 27 are a pair of substantially parallel resilient side panels 30 and 32 that depend respectively over the opposite sides of the blade holder 12, substantially, at the center thereof. A rivet 34 extends through openings in the panels 30 and 32 and blade holder 12 so as to pivotaly secure the universal connector 10 to the blade holder 12.

The connector body 26 is formed with a hollow coupler portion 28 centrally disposed between the side panels 30 and 32. The coupler portion 28 defines an elongated socket 36 of generally rectangular cross section which is formed by integral top and bottom walls 38 and 40 and side walls 42 and 44 whereby the socket 36 will receive snugly and confine all sides of a bayonet type wiper arm end.

The sides 42 and 44 extend above the top wall 38 so as to define a recess 46 in the body 26 for receiving the end of the hook arm 14. The recess 46 extends around the top, end, and bottom of coupler portion 28 and is of width complementary to the width of a typical wiper arm so as to receive the arm end snugly therein. A cantilever tab portion or flap 47 extends forwardly between the sides 42, 44 of coupler portion 28 and is provided with a tapered projection 48 thereon which is adapted to cooperatively engage with the opening 15 in the end of the hook arm. The projection 48 is tapered from the rear forwardly away from the exterior surface of the body 26 so as to provide a camming action. As the tip 14c of the hook arm 14 engages the projection 48 when the arm 14 is moved to the left as viewed in FIG. 3, it will ride downwardly urging the hook portion 14a away from the hook arm 14. When the end of the projection 48 is aligned with the opening, it will spring or be biased into it so as to provide a detachable connection with the hook arm end. The flat side 48a of the projection 48 will engage a cooperating flat side of opening 15 in the arm end portion 14a to prevent disengaging movement of the arm 14 and universal connector 10. The hook arm end will be disposed within the recess 46 formed in the body, with the projection 48 engaged in the opening 15 to detachably retain the hook arm and universal connector 10. The opening 15 and the projection 48 which cooperates therewith provide complementary means for detachably securing the hook type arm 14 to the body 26 of universal connector 10.

Figure 2:
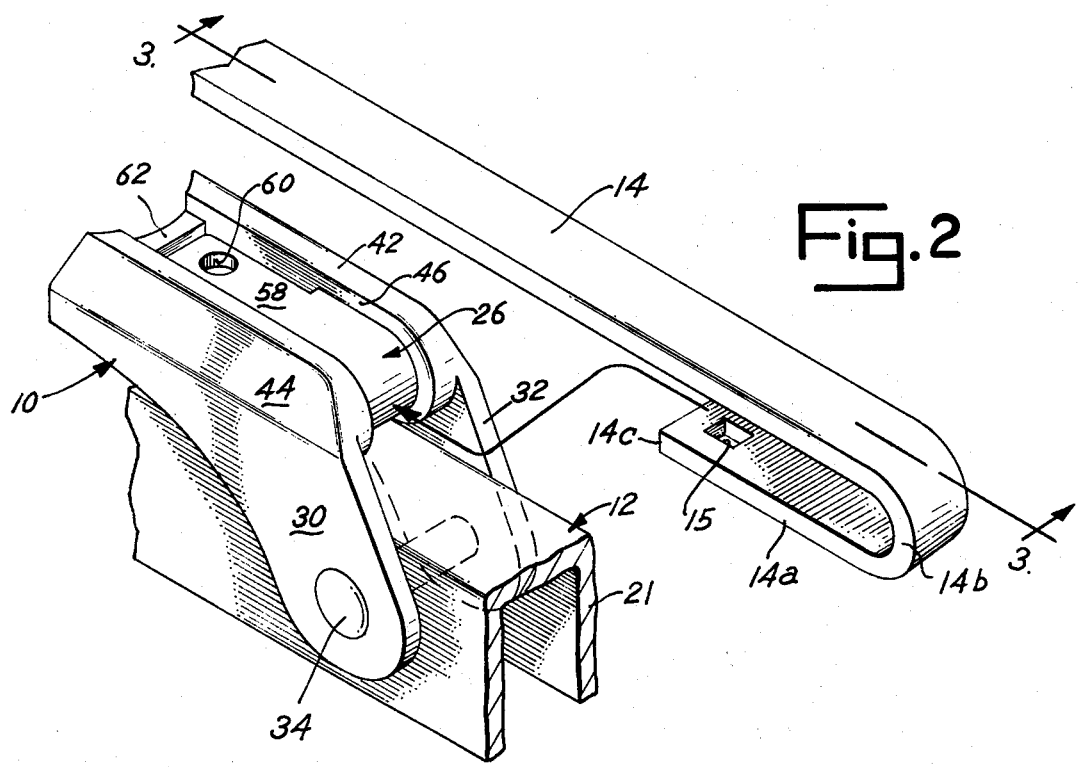
FIG. 2 is an exploded perspective view illustrating the connection of a hook arm end to the universal connector of the present invention.
Figure 3:
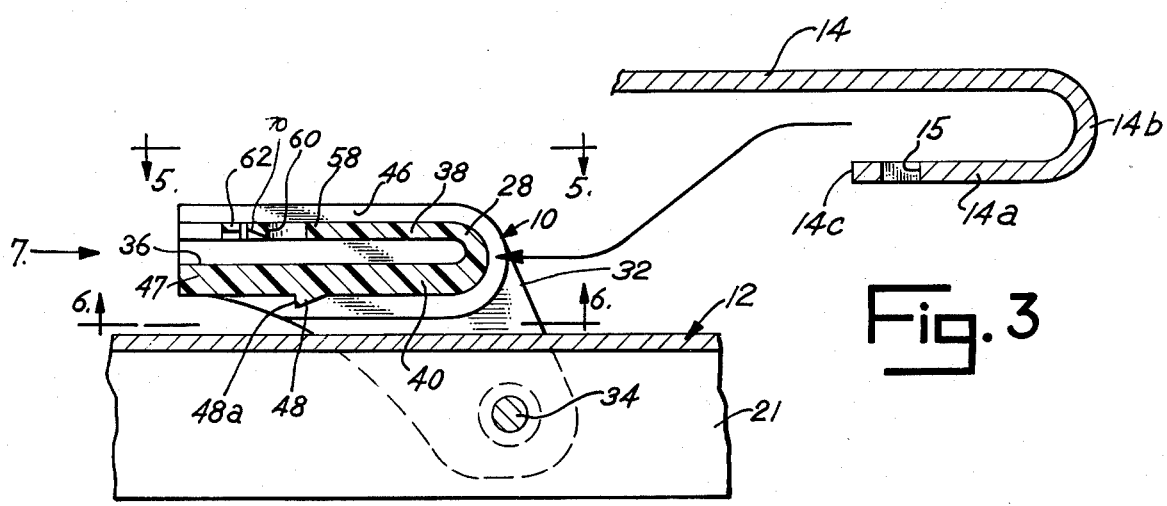
FIG. 3 is an exploded elevational view taken generally along the line 3—3 of FIG. 2 illustrating the universal connector and hook arm end prior to assembly.

When it is desired to disengage the hook arm 14 from the universal connector 10, the free end of the tab portion 47 may be pressed inwardly so as to release the projection 48 from the opening 15. Then, the arm 14 can be moved rearwardly relative to the universal connector 10 or to the right as seen in FIG. 2 so as to free the protion 14a of arm 14 from the universal connector 10.

Referring now to FIGS. 8, 9, 10 and 11 there is illustrated the connection of the end of the bayonet arm 114 to the universal connector 10. The bayonet arm 114 includes a projection 116 thereon. As shown in FIG. 8, the projection 116 is circular in cross section and is disposed adjacent the end of arm 114 on the top surface thereof. The coupler portion 28 of the universal connector 10 defines a hollow elongated socket 36 formed in part by a top wall 38 having a cantilevered tab portion or latch 58 which is provided with a hole or opening 60 therein. The hole 60 is complementary in cross sectional shape to the projection 116 and is adapted to receive the projection 116. The body 26 includes a cross portion 62 connecting the side walls 42 and 44 in front of the free end of flap or latch 58. It will be understood that the cantilevered tab portion or latch 58 may be moved upwardly and that when the moving force is released, it will spring downwardly to its initial position. This is a characteristic of the material from which the universal connector 10 is made, for example, Celcon M-90 or Delrin 500.

The tab protions 47 and 58 are cantilevered from the top and bottom of the coupler portion 28 of body 26 and are arranged in juxtaposed relationship.

The cross portion 62 is provided with recessed guide means 64 therein, adapted to be complementary in width to the width or diameter of the projection or boss 116 on the end of bayonet arm 114. The side walls 42 and 44 of body 26 define channel means 66 and 68 therein for receiving snugly the sides of the bayonet arm 114, which is generally rectangular in cross section.

When it is desired to couple the bayonet arm 114 to the universal coupler 10, the bayonet arm end is moved in the direction shown by the arrow in FIG. 10 into the socket 36 in hollow coupler portion 28. The free end of arm 114 will enter the socket 36 in coupler portion 28 of body 26 and the projection 116 will pass through the guide means 64 in the cross piece 62. Entry of the end of bayonet arm 114 into socket 36 is enhanced by the inclined surface 47a on the top leading edge of the flap or cantilevered tab portion 47 and also, by the concave configuration of the front of the coupler portion 28 of the body 26. The end of the tab portion 58 is provided on its lower leading edge with an inclined surface or ramp 70, which will be engaged by the projection 116 so as to bias or urge the cantilevered free end of the tab portion or flap 58 upwardly. The projection 116 will pass into alignment with the opening 60 in the tab portion 58 and then the free end or cantilevered end of the cantilevered tab portion 58 will be biased onto the projection 116 so as to snugly retain the end of bayonet arm 114 within the hollow elongated socket 36 in the coupler member 28. The flap or cantilevered member 47 is constructed and arranged to apply a biasing force to the underside of arm 114 to help retain same within socket 36 in coupler portion 28. The normal position of the free end of flap 47 from the bottom surface of cross portion 62 is less than the thickness of the end of bayonet arm 114 to be received in the coupler portion.

The end of bayonet arm 114 can be readily detached from the universal connector 10 whenever desired, such as for replacement of the blade holder or replacement of the wiper arm by prying up on the free end of the tab portion 58 with a screw drive, knife or like tool, to a position whereby the projection 116 is released from the opening 60 in flap 58 and moving the bayonet arm end from within socket 36.

The projection 116 on the arm end 114 and the opening 74 in the tab portion 58 provide complementary means for detachably securing the end of bayonet arm 114 to the body 26 of universal connector 10.

With reference to FIG. 11, there is illustrated the attached position of the end of bayonet arm 114 relative to the universal coupler 10. The end of bayonet arm 114 is snugly retained within the channels 66, 68 in the side walls 42, 44 of the coupler portion 28 of body 26. The projection 116 is retained within the opening 60 in the resilient tab portion 58 of the coupler portion 28 of body 26. The construction is such that there is virtually no movement of the bayonet arm 114 relative to the universal connector 10 when the windshield wiper assembly 9 is in use.

There has been provided by the present invention a universal connector that will provide for selective coupling of a windshield wiper blade holder with the end of a windshield wiper arm of either the bayonet mounting type or the hook mounting type. The universal connector 10 is formed integrally from a suitable plastic material which is able to withstand the elements without dimensional change. Either the bayonet arm or the hook arm can be readily assembled onto the connector or removed therefrom.

With the hook arm 14 connected to the universal connector, it is only necessary to push inwardly on the free end of the tab portion 47 to release projection 48 from opening 15 and thereby, permit the removal of the hook arm 14. The free end of tab 47 will project forwardly from the edge 14c of the arm 114.

With the bayonet arm 114 connected to the universal connector, a screwdriver, knife, like tool or even a fingernail, may be used to lift the free end of the tab portion 58 so as to disengage opening 60 from tab portion 116 and thereby, permit the end of bayonet 114 to be withdrawn from the hollow socket 36 of the coupler portion 28 of body 26.

While we have shown a presently preferred embodiment of the present invention, it will be understood that the invention may be otherwise embodied within the scope of the following claims.

We claim:

1. A universal connector for selectively coupling a windshield wiper blade holder with the end of a windshield wiper arm of either the bayonet mounting type or the hook mounting type comprising a unitary molded body having a pair of spaced apart side members for straddling a central portion to receive the bayonet arm end, first complementary means for detachably securing the bayonet arm end to the body, said body including a smoothly contoured exterior surface, adapted to receive a hook type arm, and second complementary means for detachably securing the hook type arm to the body.

2. A universal connector as in claim 1 wherein the first complementary means includes a first cantilevered tab portion on the body having an opening therein and said bayonet arm end has a projection adapted to engage in said opening.

3. A universal connector as in claim 2 wherein the second complementary means includes a second cantilevered tab portion on the body having a projection on the exterior thereof and the hook type arm includes an opening adapted to engage said projection on said second cantilevered tab portion.

4. A universal connector as in claim 3 wherein the first cantilevered tab portion and second cantilevered tab portion are juxtaposed on the body.

5. A universal connector as in claim 4 wherein the projection on the second cantilevered tab portion has an inclined surface tapering outwardly from the exterior toward the free end of the second cantilevered tab portion.

6. A universal connector as in claim 4 wherein the body forms a recess on the top thereof and said hook arm engages within said recess when connected to said universal connector to more securely join the hook arm with the universal connector.

7. A universal connector as in claim 2 wherein the body includes side walls defining the hollow coupler portion, and a cross portion formed integrally with the side walls forwardly on the free end of the first cantilevered tab portion, the cross portion including guide means for receiving and guiding the projection on the bayonet arm end toward the opening in said first cantilevered tab portion.

8. A universal connector as in claim 7 wherein the second complementary means includes a second cantilevered tab portion on the body having a projection on the exterior thereof, and the hook type arm includes an opening adapted to engage said projection on said second cantilevered tab portion.

* * * * *